United States Patent [19]

Audykowski

[11] 4,057,664

[45] Nov. 8, 1977

[54] PROCESS FOR THE PRODUCTION OF QUICK-CURING EPOXIDE RESIN COATINGS WHICH ARE RESISTANT TO CHEMICALS AND TO WEATHERING

[75] Inventor: Thaddeus Audykowski, Basel, Switzerland

[73] Assignee: Ciba-Geigy Corporation, Ardsley, N.Y.

[21] Appl. No.: 605,787

[22] Filed: Aug. 18, 1975

[30] Foreign Application Priority Data

Aug. 28, 1974 Switzerland .................. 11726/74

[51] Int. Cl.$^2$ .......................... B05D 1/02; B05D 1/34
[52] U.S. Cl. ................................. 427/386; 427/426; 428/413
[58] Field of Search ............... 260/2 EC, 47 EC; 428/413; 427/386, 426

[56] References Cited

U.S. PATENT DOCUMENTS

| 3,004,931 | 10/1961 | Brueschweiler | 260/47 EC |
| 3,072,606 | 1/1963 | Zuppinger et al. | 260/329 R |
| 3,072,607 | 1/1963 | Fisch et al. | 260/329 R |
| 3,080,341 | 3/1963 | Chenicek | 260/47 |
| 3,179,341 | 4/1965 | Plos et al. | 427/426 |
| 3,432,440 | 3/1969 | Shimp | 252/429 R |
| 3,607,795 | 9/1971 | Nolken | 260/47 EC |

Primary Examiner—James R. Hoffman
Attorney, Agent, or Firm—Vincent J. Cavalieri

[57] ABSTRACT

The invention relates to the production of chemically resistant epoxide resin layers on solid surfaces. The liquid component (A) which contains an epoxide compound is preferably mixed, and applied, together with the component (B) containing the curing agent, in a spraying apparatus. The coating is then cured. The curing agent contained in (B) consists essentially of $Zn(BF_4)_2$, quite specific ethers or thioethers, an acid ester of the phosphoric or pyrophosphoric acids or a certain phosphonic acid ester and water. The system is characterized by a short is preferably mixed, and applied, together with the component (b) containing the curing agent, in a spraying apparatus. The coating is then cured. The curing agent contained in (B) consists essentially of $ZN(BF_4)_2$, quite specific ethers or thioethers, an acid ester of th phosphoric or pyrophosphoric acids or a certain phosphonic acid ester and water. The system is characterized by a short curing time and produces coatings which adhere strongly and are resistant to chemicals. If the component (A) contains an epoxide compound which consists to the extent of 50 to 100% by weight of a cycloaliphatic epoxide compound, a coating is finally obtained which is resistant to weathering.

12 Claims, 2 Drawing Figures

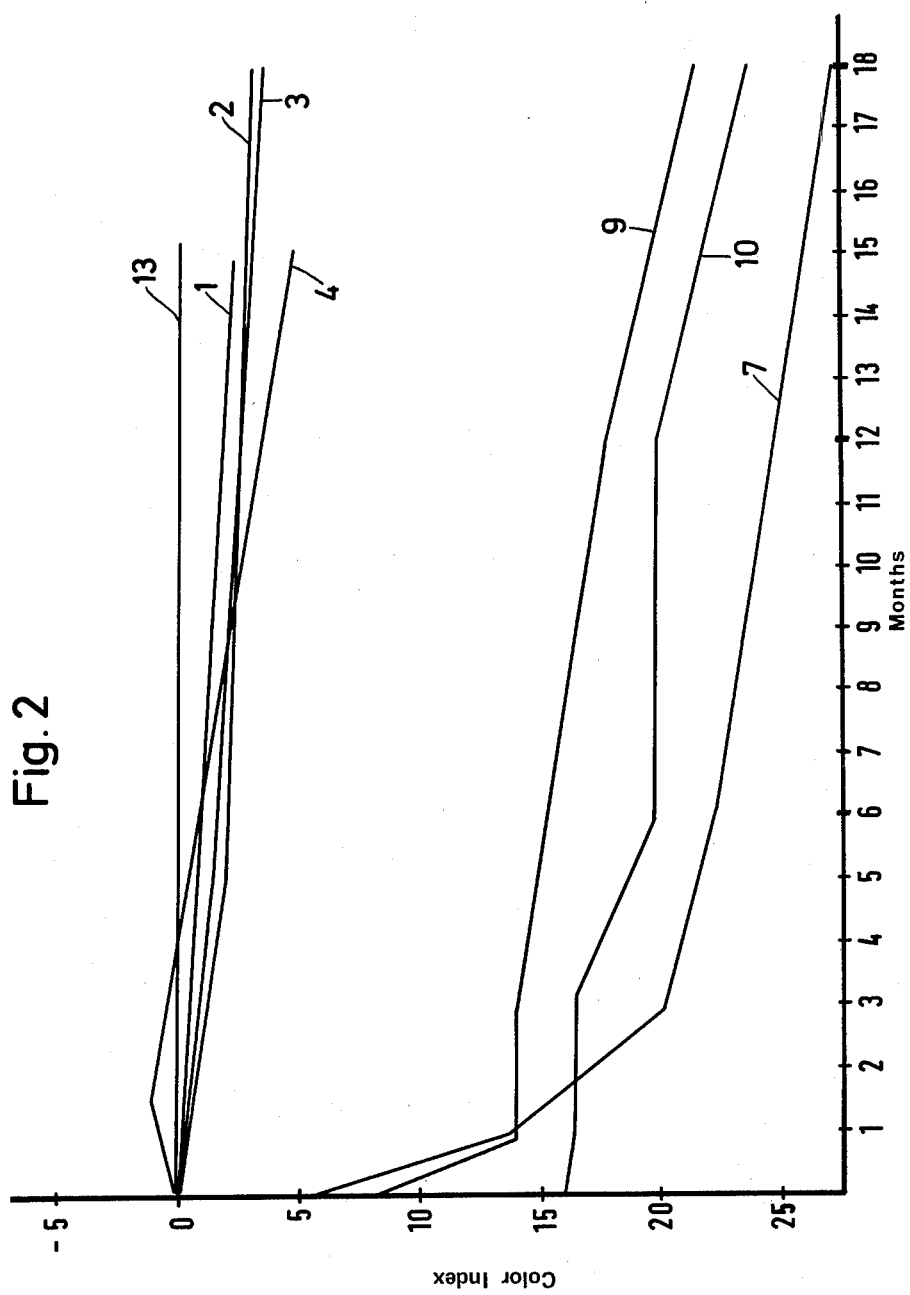

PROCESS FOR THE PRODUCTION OF QUICK-CURING EPOXIDE RESIN COATINGS WHICH ARE RESISTANT TO CHEMICALS AND TO WEATHERING

Solvent-free, cold curing epoxide coatings based on 2-component resin/curing agent systems have already been known for approx. 25 years. These conventional systems, which consist chiefly of liquid aromatic epoxide resins based on bisphenol A and liquid curing agents based on polyamines, polyamine adducts or polyaminoamide resins, have the following disadvantages. The coatings obtained are not sufficiently resistant to chemicals. In particular, they are not resistant to organic acids, such as 5 to 10% strength acetic acid. In addition, the coatings produced by known processes do not have a stable colour shade and, in most cases, their resistance to weathering is inadequate. Moreover, the curing rate of such systems is too low.

In the course of the world-wide efforts to prevent or reduce atmospheric pollution, the solvent-free epoxide coatings seem likely to gain importance in the future because they cause very little environmental pollution. Every improvement in properties, such as, for example, special resistance to chemicals and to weathering, is desirable for this reason. Increasing the curing rate of such coating systems would make them more economical to use.

In recent years there has also been no lack of attempts and proposals for such increases in curing of lacquer coatings. Thus there are already numerous patents in which the extremely rapid curing of certain organic binders by electron beams and UV rays is claimed. This type of curing however suffers from a series of disadvantages. Thus it is frequently difficult and expensive to expose large surfaces and surfaces of complicated shape, effectively and "completely" to the radiation source, which is mostly small, in a sufficiently short time. Furthermore, in the case of electron beam curing, attention must be drawn to the high investment costs and maintenance costs, and finally attention must also be drawn to the health hazard caused by these installations. In general, this type of curing is restricted to systems which contain unsaturated compounds. Epoxide resins can in general not be cured by radiation.

It is furthermore known to cure epoxide resins with curing agents which consist of a mixture of the complex $Zn(BF_4)_2$, hydrolysable esters and water. In this context, attention should be drawn to U.S. Pat. No. 3,432,440 which mentions, inter alia, acid n-butyl phosphate as a hydrolysable ester. The epoxide resin/curing agent mixtures according to this U.S. Patent all contain a carrier vehicle which is misicible with the aqueous solutions of the fluoborate salts and is at the same time compatible with the epoxide resins. Preferred carrier vehicles are polyalkylene glycols. Obviously, the systems disclosed in U.S. Pat. No. 3,432,440 are unsuitable for solvent-free epoxide resin coating, since the curing takes place too slowly and requires elevated temperatures.

It is furthermore known to manufacture plastics by copolyaddition of epoxide resins and ethers or thioethers of the furane, dihydrofurane or tetrahydrofurane series and related compounds, in the presence of metal fluoborates such as, for example, $Zn(BF_4)_2$. In this context, attention should be drawn to U.S. Pat. Nos. 3,072,606, 3,072,607 and 3,004,931. However, the processes claimed there are unsuitable for solvent-free epoxide resin coating because the curing takes place too slowly.

The object of the invention is the development of a process for solvent-free coating of surfaces of solid articles with epoxide resins, in which very rapid, troublefree curing is ensured, and which leads to a firmly adhering protective layer which exhibits substantially improved resistance to chemicals over the comparable coatings according to the state of the art.

The subject of the invention is a process for the production of chemically resistant, firmly adhering epoxide resin layers on solid surfaces by mixing a liquid component (A), which contains the epoxide compound, having on average more than one epoxide group in the molecule, with a liquid component (B) which contains the curing agent, shortly before use, with exclusion of unreacted organic solvents, applying this mixture to the surface, preferably using a 2-component spraying apparatus, and subsequent curing, which is characterised in that a. the curing agent contained in the component (B) consists essentially of 1.7 to 15.5% by weight of $Zn(BF_4)_2$, 7.0 to 65.0% by weight of a cyclic ether or thioether of the formula I

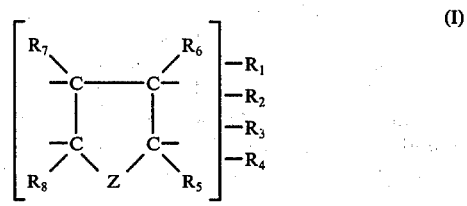

or of the formula II

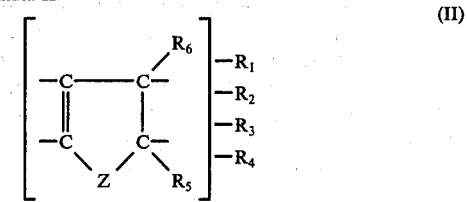

or of the formula III

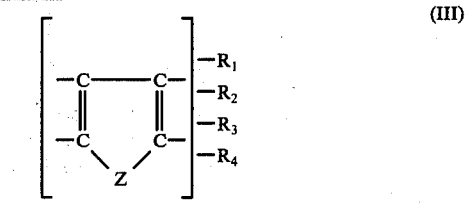

wherein $R_1$, $R_2$, $R_3$, $R_4$, $R_5 R_6$ and $R_7$ denote hydrogen atoms or monovalent organic radicals and the radicals $R_1$, $R_2$, $R_3$, $R_4$ and $R_5$ can also be members of a ring system, $R_8$ denotes a monovalent organic radical and Z denotes an oxygen atom or sulphur atom, or of a cyclic ether or thioether which contain, per molecule, at least two monovalent radicals of the formula IV

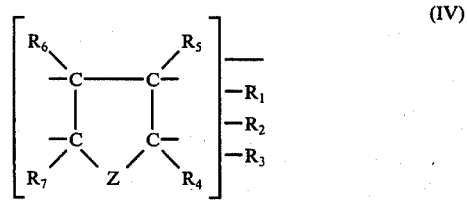

or of the formula V

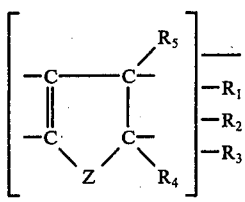

or of the formula VI

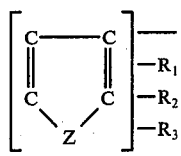

wherein $R_1$, $R_2$, $R_3$, $R_4$, $R_5$, $R_6$ and $R_7$ denote hydrogen atoms or monovalent organic radicals, and the radicals $R_1$, $R_2$ and $R_3$ can also be members of a ring system, and Z denotes an oxygen atom or sulphur atom, 10 to 90% by weight of an acid ester of phosphoric acid or of pyrophosphoric acid or of a phosphonic acid ester which contains at least one cyclic phosphate group with 5 to 6 ring atoms and 1.0 to 9.0% by weight of water, and that b. the components (A) and (B) are mixed in a ratio such as to provide 0.5 to 2.5 parts by weight of $Zn(BF_4)_2$ per 100 parts by weight of the epoxide compound or of the epoxide compound mixture.

According to the invention, the component (A) can contain any desired, technically suitable epoxide compound including, for example, bisphenol-A epoxide resins, novolac epoxide resins and aliphatic epoxide resins.

A preferred form of the invention is the use of cycloaliphatic, especially of liquid, epoxide compounds. They should preferably account for from 50 to 100% by weight of the epoxide compound in the component (A).

The following types should be mentioned as cycloaliphatic, liquid epoxide compounds: bis-(3,4-epoxy-6-methylcyclohexylmethyl) adipate, 3,4-epoxycyclohexylmethyl- 3,4-epoxycyclohexane carboxylate, 3,4-epoxy-6-methycyclohexylmethyl - 3,4-epoxy-6-methylcyclohexane carboxylate, tetrahydrophthalic and hexahydrophthalic acid diglycidyl ester and 1-epoxyethyl-3,4-epoxycyclohexane.

Preferably, pure cycloaliphatic epoxide resins are used, that is to say no non-aliphatic epoxide resins are admixed. Diglycidyl compounds based on hydrogenated phenols of the formula VII

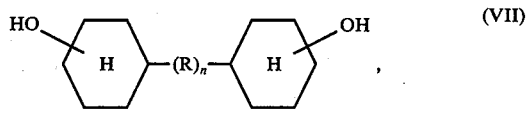

in which R represents on of the radicals —$CH_2$—,

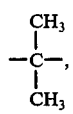

—$SO_2$—, —SO—, —S—and —O—and n is 0 or 1, are particularly suitable.

Preferably, the diglycidyl ether of 4,4′-dihydroxydicyclohexylmethane is employed.

If mixtures, according to the invention, of cycloaliphatic epoxide compounds with other epoxide resins are used, the diglycidyl ether of 4,4′-dihydroxydiphenylmethane and/or of butanediol are preferred as such admixed substances. In principle, however, other non-aliphatic epoxide compounds are also suitable as constituents of such mixtures, including, for example, 2,6-tetramethylol-cyclohexanol-tetraglycidyl ether, cyclohexanone-2,2,6,6-tetrapropionic acid glycidyl ester, 2-(α,α-dimethyl-β-glycidyloxyethyl)-4-(glycidyloxybutyl) -1,3-dioxolane and diglycidyl esters of the condensation product of phthalic anhydride and polypropylene glycol.

The curing agent contained in the component (B) can also contain mixtures of monoesters and diesters of phosphoric acid or of pyrophosphoric acid as the acid ester of phosphoric acid or of pyrophosphoric acid. Technical acid esters of phosphoric acid or of pyrophosphoric acid are in general such mixtures of acid and neutral esters. They in most cases additionally contain small amounts of the free acids. The latter technical mixtures are also suitable for use as constituents of the curing agents in component (B).

Particularly suitable constituents of the curing agents for component (B) are the mixtures of mono-n-butyl and di-n-butyl phosphate and mixtures of monomethyl and dimethyl pyrophosphate.

Further suitable acid esters of phosphoric acid and of pyrophosphoric acid are the following substances: ethyl, amyl, allyl, octyl and nonyl esters of phosphoric acid and pyrophosphoric acid.

As phosphonic acid esters which contain at least one cyclic phosphonate group with 5 or 6 ring atoms, the curing agent contained in the component (B) can in particular contain substances which are manufactured according to the process of French Pat. No. 1,503,429. Preferably, phosphonic acid esters of this type having a low molecular weight are employed, so that the mixture which can be used according to the process of the invention is of sufficiently low viscosity and sufficiently reactive. The following may be listed as such suitable substances: butane-1,4-bis-(phosphonic acid monoethyl ester), ethane-1,2-bis-(phosphonic acid monoethyl ester) and 2-benzyl-4-hexyl-1,3-dioxa-2-oxophospholane.

In principle, mixtures of the substances of several of the abovementioned categories of materials can also be used as a constituent for the curing agent of component (B).

The preferred composition of the curing agent is as follows: 8.5 - 13.5% by weight of $Zn(BF_4)_2$, 36.0 - 58.0% by weight of tetrahydrofurfuryl alcohol, 20.0 - 50.0% by weight of a mixture of mono-n-butyl and di-n-butyl phosphate and/or of a mixture of monomethyl pyrophosphate and dimethyl pyrophosphate and 2.0 - 5.5% by weight of water.

Accordingly, the most suitable cyclic ether of the formula I is tetrahydrofurfuryl alcohol. Further suitable cyclic ethers and thioethers of the formulae I to III are all the substances which are listed in column 3 in U.S. Pat. No. 3,072,606.

Further suitable cyclic ethers or thioethers which contain at least two monovalent radicals of the formulae IV to VI in the molecule are all the substances which have been listed in columns 3 and 4 of U.S. Pat. No. 3,072,607.

The said ethers and thioethers of the formulae I to VI are furane, thiophene, derivatives of these two substances, derivatives of tetrahydrothiophene and of dihydrofurane and especially derivatives of tetrahydrofurane.

In the component (B), the complex $Zn(BF_4)_2$ is optionally present in a hydrated form, for example as $Zn(H_2O)_8(BF_4)_2$.

To manufacture pigmented coating materials, the pigments can be dispersed in the liquid component (A), optionally with addition of suitable additives such as anti-sedimentation agents, flow control agents, anti-foaming agents and de-aerating agents and the like, by grinding on triple-roll mills or Cowles dissolvers. The addition of reactive diluents is also possible. The curing agent component is preferably admixed unpigmented or, if necessary, containing only small proportions of suitable colour pastes, which have been produced, for example, by grinding in the plasticiser or in neutral resin. If this procedure is used, the requisite perfect mixing of the resin and the curing agent component can be checked during application.

The mixing of the components (A) and (B) and the application of the mixtures thus obtained to the surface of the particular solid body is preferably effected by means of a spray gun or spraying installation for 2-component systems, and during application the components are preferably kept at such temperatures that the mixture of the two components, on striking the solid surface, is at a temperature of about 40° to 90° C. This ensures sufficiently low viscosity and good levelling of the film, and gelling then takes place within a few seconds. The final curing is substantially accelerated at these temperatures. In principle, the process can also be carried out at somewhat lower temperatures. In that case, the gelling takes place more slowly, for example after 15 minutes. The curing then also takes place correspondingly more slowly.

The process according to the invention can be used for coating customary substrates, such as metal (especially steel), wood and glass fibre-reinforced plastics.

The process according to the invention ensures sufficiently rapid curing of the applied film, if appropriate under extreme conditions such as low temperatures, down to 0° C, and high atmospheric humidity.

Surprisingly, good curing also takes place if the film is a thin layer (60 to 80 $\mu$). This means that no problem due to excessively rapid cooling of the film takes place, as is the case with known systems, and that the process according to the invention is characterised by the high reactivity of the mixtures employed. Coatings which exhibit exceptionally good resistance to chemicals are obtained.

At the same time, the coatings obtainable by the process according to the invention also exhibit all the properties which are expected from a valuable lacquer, including, for example, good adhesion, impact strength and flexibility.

If the process according to the invention is used with components (A) which contain an epoxide compound which consists to the extent of 50 to 100% by weight of a cycloaliphatic (preferably liquid) epoxide compound with an average of more than one epoxide group in the molecule, films and coatings which are distinguished by outstanding resistance to weathering are obtained. Both the change in colour shade and the decrease in gloss of the film on weathering are astonishingly low, compared to conventional epoxide resin coatings applied without solvent.

This previously unattained resistance to weathering of epoxide resin coatings which have been applied without solvent was particularly surprising because firstly cycloaliphatic epoxide resin has hitherto been regarded as not very suitable for appropriate 2-component systems and, secondly, zinc fluoborates had not hitherto found acceptance as catalysts for such systems. It was only the combination of the cycloaliphatic epoxide compounds, which are in themselves unsuitable for solvent-free coatings, with the specific curing agent containing $Zn(BF_4)_2$ in the components (A) and (B) led, unexpectedly, to the solution of this technical problem.

The invention is explained in more detail below with the aid of the examples. In these examples, parts denote parts by weight.

FIG. 2 shows the resistance to weathering (change in whiteness) of the epoxide resin coatings obtained according to Examples 1, 2, 3, 4, 7, 10 and 13.

Figure 1:
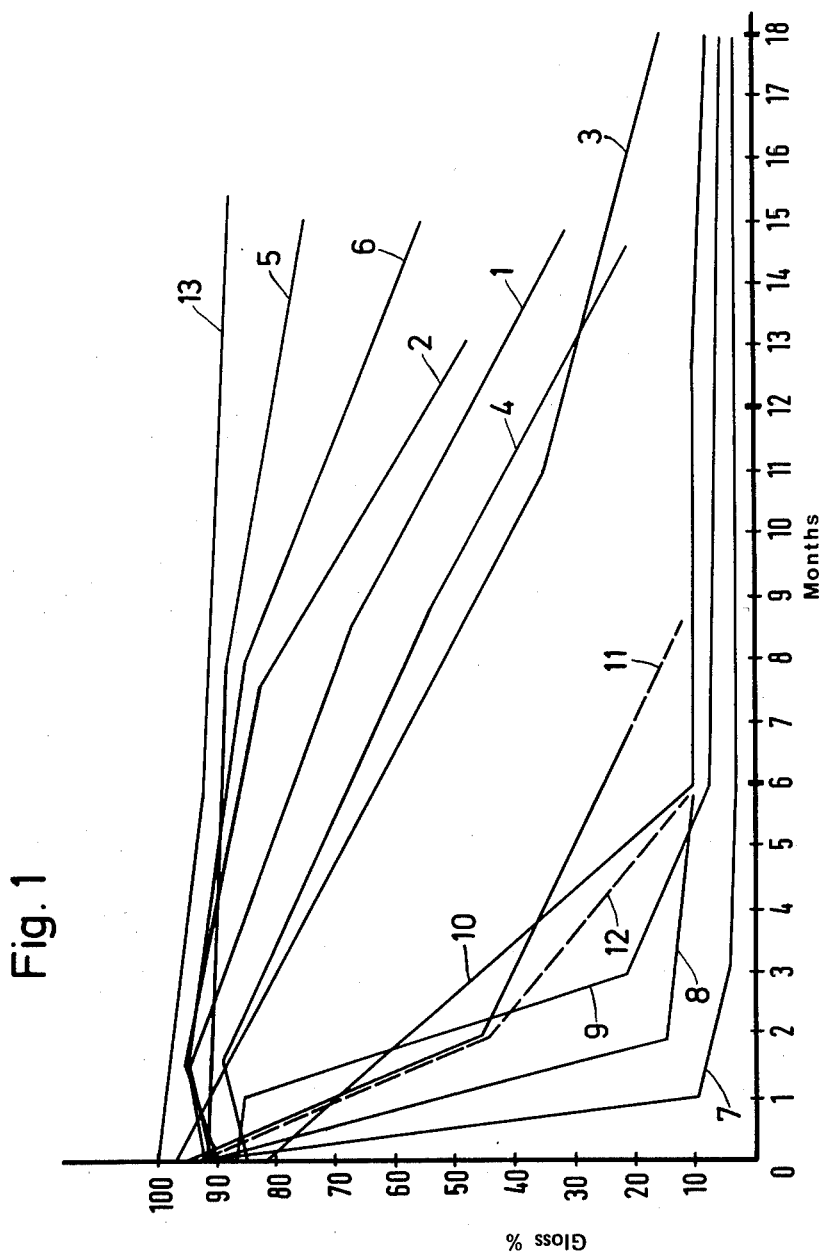
FIG. 1 shows the resistance to weathering (change in gloss) of the epoxide resin coatings obtained according to Examples 1 to 13.

EXAMPLE 1 a. Manufacture of the zinc fluborate solution X 7.2 parts of water and 10.3 parts of dried zinc fluoride are added to 51 parts of the tetrahydrofurfuryl alcohol (distilled; water content 0.22% by weight). 6.7 parts of $BF_3$ gas are introduced whilst cooling. After 12 hours (standing) the solution is filtered and freed from excess zinc fluoride (5.6 parts).

Thereafter, a light brown liquid (zinc fluoborate solution X) is obtained, which contains the complex $Zn(H_2O)_8(BF_4)_2$.

| Viscosity at 20° C | 56 cP |
|---|---|
| at 25° C | 42 cP |

Odour: of tetrahydrofurfuryl alcohol
Shelf life: practically unlimited.
pH on dilution with water in a 1 : 1 volume ratio: 3 to 4.

b. Preparation of the weathering-resistant epoxide resin layer, and testing

The liquid components (A) and (B) shown below are employed. The stated amounts of the individual components are the amounts for the batch according to the present example.

| Component (A) | |
|---|---|
| Diglycidyl ether of 4,4'-dihydroxydicyclohexyl-methane (4.4 epoxide equivalents/kg, $\eta$ at 25° C $\leq$ 2,500 cp) | 900 parts |
| titanium dioxide (rutile type) | 100 parts |
| Component (B) | |
| zinc fluoborate solution X | 50 parts |
| mono-n-butyl phosphate (technical grade) | 50 parts |
| | 1,100 parts |

The component (A) is warmed to 80° C and mixed with the component (B) by means of a type KMI 2750 2-component spraying apparatus of Messrs. Kent-Moore, Intern., Zug, Switzerland. As is usual, the liquid thus obtained is sprayed, within a fraction of a second after mixing, onto 1 mm steel sheets (250 × 400 mm). The resulting lacquer film, which is about 350 to 400 $\mu$ thick, gels within about 2 to 3 minutes. After a total of 10 to 15 minutes, the film is non-smudging, that is to say it can be worked if desired.

The lacquer film on the metal sheets is exposed to weathering for 15 months (location: Basel, Margarethenpark). The factors of interest are the change in gloss and in whiteness (Colour Index) of the lacquer film in the course of weathering.

The gloss is measured by means of a model 610 Photovolt reflection meter of Messrs. Photovolt Corporation at 60° angle of incidence, the measured reflection values or gloss values relating to an ideal mirror of reflection value 100, and a black glass plate, calibrated to a value of 96, being used to calibrate the apparatus to this maximum value.

To measure the changes in whiteness, the same reflection meter is used, and the degree of whiteness can be calculated by means of the tristimulus filters red, green and blue, which are intended to provide measurements in the tristimulus colorimetry system (International Commission on Illumination 1931). These filters correspond to the prescriptions of the "National Bureau of Standards".

The reference standard used is a calibrated small white enamel sheet with the following calibration values:

| | |
|---|---|
| blue | 75.5 |
| green | 75.5 |
| red | 74.5 |

The degree of whiteness of the tested coating surfaces is quoted as the "Color Index" which is calculated as follows after the reflection measurements with the filters.

$$\text{Color Index} = \frac{\text{Reflection (red)} - \text{Reflection (blue)}}{\text{Reflection (green)}} \times 100$$

The figures obtained indicate the degree of yellowness in the case of positive values and the degree of bluishness in the case of negative values.

Table I which follows lists the values of the gloss and of the whiteness of the freshly applied lacquer film (unweathered) and the values which are obtained in the course of weathering.

Table I

| Duration of weathering (months) | Gloss % | Whiteness (Color Index) No. |
|---|---|---|
| Start (0) | 88 | 0 |
| 1½ | 94 | 0.025 |
| 6 | 77 | 1.0 |
| 9 | 64 | 1.5 |
| 12 | 46 | 2.0 |
| 15 | 30 | 2.5 |

EXAMPLES 2 to 6

The procedure followed is exactly as in Example 1 except for the difference that the particular components (A) and (B) are of different composition and are mixed with one another in different ratios. The corresponding data are listed in Table II. The figures given therein denote parts by weight.

The lacquer films obtained according to Examples 2 to 6 are also exposed to a weathering test (as described in Example 1). The values obtained are illustrated in FIGS. 1 and 2 and compared with values of conventional epoxide resin coatings applied without solvents. The curves show clearly that both the gloss and the whiteness of the epoxide resin layers produced according to the process of the invention are very much more stable than those of the coatings produced according to conventional processes.

The conventional coating systems used are the following comparison examples:

EXAMPLE 7

Glycidyl ether based on 4,4'-dihydroxydiphenylmethane. The curing agent used is a mixture of cycloaliphatic polyamines, consisting of 13.4 parts of

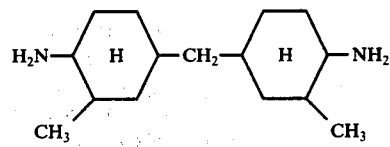

and 11.6 parts of

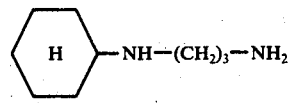

(the sum of these parts being per 75 parts of epoxide resin).

EXAMPLE 8 and 11

Glycidyl ether as in Example 7. The curing agents are liquid aromatic polyamine adducts based on methylenedianiline. The difference between Examples 8 and 11 is slight and is attributable to the composition of the adducts and the concentration of the curing agents in the resin.

EXAMPLE 9

Glycidyl ether as in Example 7. The curing agent is a liquid polyaminoamide; $\eta$ at 25° C: 12,500 - 17,500 cP. Active $H^{30}$ equivalent weight: 100 - 200

$$((H^+ = \frac{\text{Molecular weight of the amine}}{n \text{ of active } H^+})$$

EXAMPLE 10

Glycidyl ether as in Example 7. The curing agent is a liquid polyaminoamide; $\eta$ at 25° : 4,000 - 5,000 cP active $H^{30}$ equivalent weight : 105 - 120.

EXAMPLE 12

Glycidyl ether as in Example 7, curing agent as in Example 8. The system according to Example 12 is pigmented green whilst the systems according to Examples 7 to 11 and 13 are pigmented white.

EXAMPLE 13

White-pigmented polyurethane enamels based on a polyester of isophthalic acid and trimethylolethane ( OH number 8%; name: Desmophen 650) and on an aliphatic triisocyanate (Desmodur N), which is based on a reaction product of hexamethylenediisocyanate with water

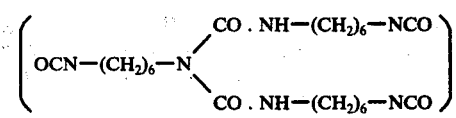

NCO content 16 - 17%.

Table II

| Example No. | | 1 | 2 | 3 | 4 | 5 | 6 |
|---|---|---|---|---|---|---|---|
| Component (A) | Diglycidyl ether of 4,4'-dihydroxydicyclohexylmethane; 4.4 epoxide equivalents/kg; η at 25° C ≦ 2,500 cP | 900 | 900 | 450 | 450 | 877 | 450 |
| | Diglycidyl ether of 4,4'-dihydroxydiphenylmethane; 5.2 epoxide equivalents/kg; η at 25° C = 8,000 – 12,000 cP | | | 450 | 450 | | 427 |
| | Butanediol diglycidyl ether, 7 – 8 epoxide equivalents/kg; η at 25° C = 14–22 cP | | | 100 | 100 | | |
| | Titanium dioxide (rutile type) | 100 | 100 | 100 | 100 | | |
| | Pigment mixture of green chromium oxide and phthalocyanine blue in the weight ratio of 65:5 | | | | | 123 | 123 |
| Component (B) | Zinc fluoborate solution X | 50 | 80 | 50 | 80 | 50 | 80 |
| | Mono-n-butyl phosphate (technical grade) | 50 | | 50 | | 50 | |
| | Monomethyl pyrophosphate (technical grade) | | 20 | | 20 | | 20 |

EXAMPLE 14

The procedure followed is exactly as in Example 2 except that a liquid bisphenol A resin is employed and no titanium dioxide is added.

The lacquer film obtained is tested for one year for resistance to chemicals. The results are summarised in Table III and are compared with the values for a conventional resin (Example 16). The superiority of the system according to the invention in respect of resistance to acetic acid can be seen.

COMPARISON EXAMPLE 16

A mixture of 100 parts by weight of bisphenol A epoxide resin and 35 parts of an amine adduct curring agent is prepared. (The amine curing agent is prepared beforehand by reaction of 1,6-diamino-2,2,4-trimethylhexane, bisphenol A epoxide resin and phenol in the equivalent ratio 5:1:1).

The conventional epoxide resin system thus obtained is cured for 7 days at room temperature and is then tested for its resistance to chemicals (see Table III).

Table III

Comparison of the chemical resistance achieved by cationic polymerisation (according to the invention) and by conventional polyamine curing.

| | Ionic polymerisation | | Polyaddition |
|---|---|---|---|
| Curing mechanism Tested after ... months | Example 14<br>1 2 3 4 5 6 7 8 9 10 11 12 | Example 15<br>1 2 3 4 5 6 7 8 9 10 11 12 | Example 16<br>1 2 3 4 5 6 7 8 9 10 11 12 |
| deionised water | + + + + + + + + + + + + | + + + + + + + + + + + + | + + + + + + + + + + + + |
| 10% strength hydrochloric acid | + + + + + + + + + + + + | + D | + + + + + + + + + + + + |
| 50% strength sulphuric acid | + + + + + + + + + + + + | D | + + + + + + + + + + + + |
| 20% strength sodium hydroxide solution | + + + + + + + + + + + + | + + + + + + + + + + + + | |
| concentrated ammonia | + + + + + + + + + + + + | + + + A A A A$_D$ | + + + + + + + + + + + + |
| 5% strength acetic acid | + + + + + + + + + + + + | D | + D |
| 10% strength acetic acid | + + + + + + + + + + + + | D | D |
| 50% strength ethyl alcohol | A A D | + + + + + + + + + + + + | A A + + + + + + + + + + |
| 95% strength ethyl alcohol | D | + + + + + + + + + + + + | A A A A A A A A A A A A |
| xylene | + + + + + + + + + + + + | + + + + + + + + + + + + | |
| petrol containing lead additives | + + + + + + + + + + + + | + + + + + + + + + + + + | |
| crude oil | + + + + + + + + + + + + | + + + + + + + + + + + + | + + + + + + + + + + + + |
| methyl ethyl ketone | D | + + + D | D |

Legend: + resistance; A attacked; D destroyed

EXAMPLE 15

The procedure followed is exactly as in Example 14 except for the difference that the epoxide resin employed in the component (A) is a mixture of 48% by weight of 2,6-tetramethylol-cyclohexanol-tetraglycidyl ether and 52% by weight of a mixture of aliphatic glycidyl ethers of the following composition: 14 parts by weight of hexanetriol glycidyl ether and 14 parts by weight of butanediol glycidyl ether per 24 parts by weight of pentaerythritol glycidyl ether.

The lacquer film obtained is also examined for its resistance to chemicals (see Table III). The resistance to very aggressive organic solvents (ethyl alcohol), as compared to conventional systems, can be seen clearly.

What we claim is:

1. Process for the production of chemically resistant, firmly adhering epoxide resin layers on solid surfaces by mixing a liquid component (A), which contains the epoxide compound, having on average more than one epoxide group in the molecule, with a liquid component (B) which contains the curing agent, shortly before use, with exclusion of unreacted organic solvents, applying this mixture to the surface, and subsequent curing, characterised in that a. the curing agent contained in the component (B) consists essentially of 1.7 to 15.5% by weight of $Zn(BF_4)_2$, 7.0 to 65.0% by weight of a cyclic ether or thioether of the formula I

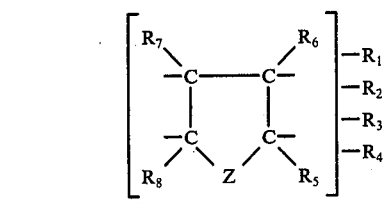 (I)

or of the formula II

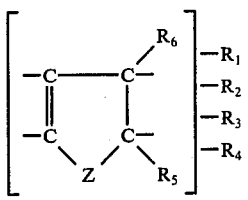 (II)

or of the formula III

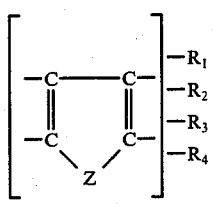 (III)

wherein $R_1$, $R_2$, $R_3$, $R_4$, $R_5$, $R_6$ and $R_7$ denote hydrogen atoms or monovalent organic radicals and the radicals $R_1$, $R_2$, $R_3$, $R_4$ and $R_5$ can also be members of a ring system, $R_8$ denotes a monovalent organic radical and Z denotes an oxygen atom or sulphur atom, or of a cyclic ether or thioether which contain, per molecule, at least two monovalent radicals of the formula IV

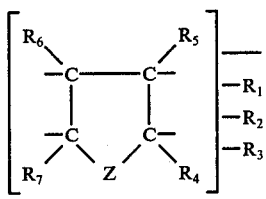 (IV)

or of the formula V

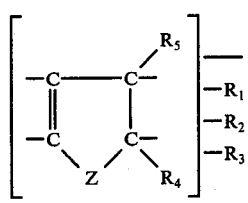 (V)

or of the formula VI

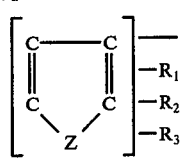 (VI)

wherein $R_1$, $R_2$, $R_3$, $R_4$, $R_5$, $R_6$ and $R_7$ denotes hydrogen atoms or monovalent organic radicals, and the radicals $R_1$, $R_2$ and $R_3$ can also be members of a ring system, and Z denotes an oxygen atom or sulphur atom, 10 to 90% by weight of an acid ester of phosphoric acid or of pyrophosphoric acid or of a phosphonic acid ester which contains at least on cyclic phosphonate group with 5 or 6 ring atoms and 1.0 to 9.0% by weight of water, and that b. the components (A) and (B) are mixed in a ratio such as to provide 0.5 to 2.5 parts by weight of $Zn(BF_4)_2$ per 100 parts by weight of the epoxide compound or of the epoxide compound mixture.

2. Process according to claim 1, characterised in that the component (A) contains an epoxide compound which consists to the extent of 50 to 100% by weight of a cycloaliphatic epoxide compound having on average more than one epoxide group in the molecule.

3. Process according to claim 2, characterised in that the component (A) contains an epoxide compound which consists to the extent of 50 to 100% by weight of a liquid, cycloaliphatic epoxide compound.

4. Process according to claim 3, characterised in that the component (A) contains, as the cycloaliphatic epoxide compound, a diglycidyl compound based on hydrogenated phenols of the formula VII

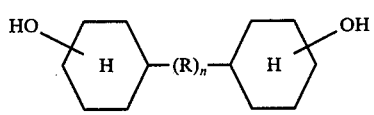 (VII)

in which R represents one of the radicals —CH$_2$—,

—SO$_2$—, —SO—, —S— and —O— and $n$ is 0 or 1.

5. Process according to claim 4, characterised in that the component (A) contains the diglycidyl ether of 4,4'-dihydroxydicyclohexylmethane as the diglycidyl compound based on hydrogenated phenols of the formula (VII).

6. Process according to claim 1, characterised in that the epoxide compound contained in the component (A) consists to the extend of 100% of a liquid, cycloaliphatic epoxide compound having on average more than one epoxide group in the molecule.

7. Process according to claim 1, characterised in that the epoxide compound contained in the component (A) consists partially of the diglycidyl ether of 4,4'-dihydroxydiphenylmethane or of butanediol.

8. Process according to claim 1, characterised in that the curing agent contained in the component (B) contains tetrahydrofurfuryl alcohol as the cyclic ether of the formula I.

9. Process according to claim 1, characterised in that the curing agent contained in component (B) contains a mixture of monoesters and diesters of phosphoric acid or of pyrophosphoric acid as the acid ester of phosphoric acid or of pyrophosphoric acid.

10. Process according to claim 1, characterised in that the curing agent contained in component (B) contains, as acid esters of phosphoric acid or of pyrophosphoric acid, a mixture of the acid n-butyl ester of phosphoric acid (mono-n-butyl phosphate) and of neutral di-n-butyl phosphate or a mixture of the acid methyl ester of pyrophosphoric acid (monomethyl pyrophosphate) and of the neutral dimethyl ester of pyrophosphoric acid.

11. Process according to claim 1, characterised in that the curing agent contained in component (B) contains, as the acid ester of phosphoric acid or of pyrophosphoric acid, or as a phosphonic acid ester containing a cyclic phosphonate group with 5 or 6 ring atoms, a mixture of several substances of these 3 categories of materials.

12. Process according to claim 1, characterised in that the curing agent contained in component (B) has the following composition: 8.5 – 13.5% by weight of $Zn(BF_4)_2$, 36.0 – 58.0% by weight of tetrahydrofurfuryl alcohol, 20 – 50% by weight of a mixture of mono-n-butyl phosphate and di-n-butyl phosphate and/or of a mixture of monomethyl pyrophosphate and dimethyl pyrophosphate and 2.0 – 5.5% by weight of water.

* * * * *